United States Patent [19]

Atsuta

[11] Patent Number: 6,160,800
[45] Date of Patent: Dec. 12, 2000

[54] TDMA COMMUNICATING METHOD AND TDMA RECEIVING APPARATUS

[75] Inventor: Hirosada Atsuta, Tokyo, Japan

[73] Assignee: NEC Corporation, Tokyo, Japan

[21] Appl. No.: 08/711,124

[22] Filed: Sep. 9, 1996

[30] Foreign Application Priority Data

Sep. 12, 1995 [JP] Japan .................................. 7-234086

[51] Int. Cl.⁷ .................................................. H04B 7/212
[52] U.S. Cl. .......................... 370/337; 370/321; 370/347; 370/458
[58] Field of Search .................................. 370/321, 328, 370/329, 330, 336, 337, 341, 342, 345, 347, 458, 350, 498, 509, 512; 455/517

[56] References Cited

U.S. PATENT DOCUMENTS

| | | |
|---|---|---|
| 3,540,055 | 11/1970 | Takagi . |
| 4,628,517 | 12/1986 | Schwarz et al. .......................... 375/267 |
| 5,203,025 | 4/1993 | Anvari et al. . |
| 5,396,496 | 3/1995 | Ito et al. .................................. 455/314 |
| 5,410,588 | 4/1995 | Ito .......................................... 455/502 |
| 5,442,653 | 8/1995 | Saito ....................................... 375/219 |
| 5,528,585 | 6/1996 | Cooley et al. ........................... 370/347 |
| 5,564,074 | 10/1996 | Juntti ...................................... 455/67.1 |
| 5,574,966 | 11/1996 | Barzegar et al. ........................ 455/6.1 |

FOREIGN PATENT DOCUMENTS

| | | |
|---|---|---|
| 0065674 | 12/1982 | European Pat. Off. . |
| 0652644 | 5/1995 | European Pat. Off. . |
| 1-300634 | 12/1989 | Japan . |
| 3-143123 | 6/1991 | Japan . |
| 3-206743 | 9/1991 | Japan . |
| 2268027 | 12/1993 | United Kingdom . |

OTHER PUBLICATIONS

H. Nakayama, et al., "26GHz Band Digital Subscriber Radio System (26SS–D1) For High–Speed Digital Communications", IEEE ICC, 1985, pp. 729 (23.1.1)—734 (23.1.6).
Patent Abstracts of Japan, vol. 011, No. 390 (E–567), Dec. 19, 1987 & JP 62–155628, Jul. 10, 1987, *abstract*.
Patent Abstracts of Japan, vol. 014, No. 308 (E–0947), Jul. 3, 1990 & JP 2–098238, Apr. 10, 1990, *abstract*.
Patent Abstracts of Japan, vol. 015, No. 365 (E–1111), Sep. 13, 1991, & JP 3–143123, Jun. 18, 1991, *abstract*.

Primary Examiner—Ajit Patel
Assistant Examiner—Bob A. Phunkulh
Attorney, Agent, or Firm—Ostrolenk, Faber, Gerb & Soffen, LLP

[57] ABSTRACT

A TDMA receiving apparatus for use with a base station including a plurality of receiving antennas, a plurality of outdoor units for converting received signals into first intermediate frequency signals, a plurality of unit connecting cables for sending the intermediate frequency signals, and an indoor unit for obtaining demodulated signals from the intermediate frequency signals. The indoor unit has a plurality of second frequency converters for converting the first intermediate frequency signals into second intermediate frequency signals with the same frequency and a power combining unit for combining the second intermediate frequency signals. The combined intermediate frequency signal is demodulated by a common demodulating circuit.

11 Claims, 5 Drawing Sheets

FIG. 3

(1) PRESENT INVENTION
(TDMA SYNCHRONOUS FRAME IN COMMON WITH EACH ZONE)

20 TS | 20 TS | 20 TS
60 TS

ADDED BITS (2) RELATED ART (TDMA SYNCHRONOUS FRAME FOR SECTOR ZONE 1)
(TDMA SYNCHRONOUS FRAME FOR SECTOR ZONE 2)
(TDMA SYNCHRONOUS FRAME FOR SECTOR ZONE 3)

20 TS

ADDED BITS (a) STRUCTURE OF TDMA SYNCHRONOUS FRAME

SECTOR ZONE 1
SECTOR ZONE 2
SECTOR ZONE 3
SECTOR ZONE 1 — $f_1$
SECTOR ZONE 2 — $f_2$
SECTOR ZONE 3 — $f_3$ (b) FREQUENCY SPECTRUM

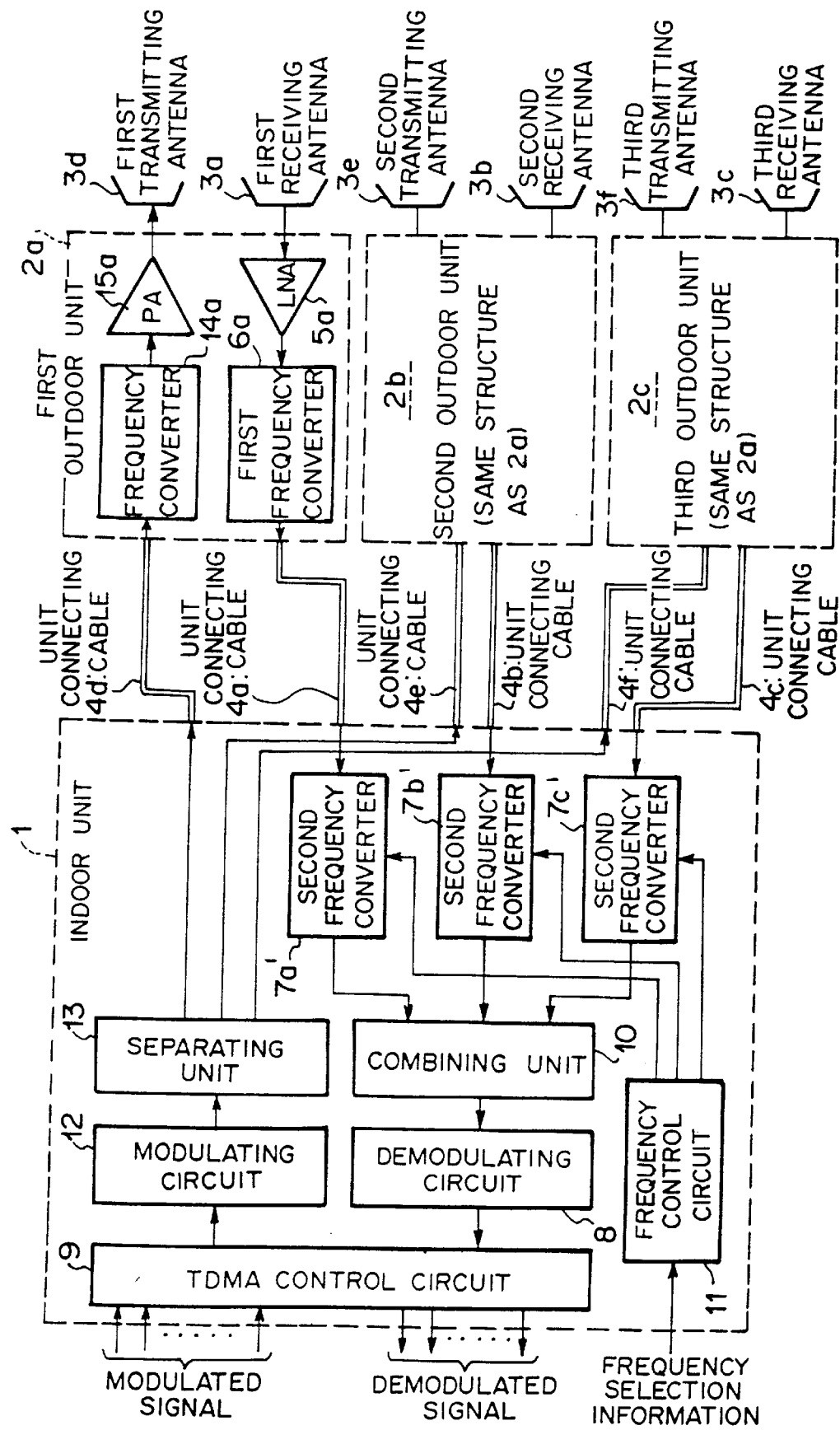

TDMA COMMUNICATING METHOD AND TDMA RECEIVING APPARATUS

BACKGROUND OF THE INVENTION

1. Field of the Invention

The present invention relates to a TDMA Communicating Method and a TDMA receiving apparatus, in particular, to a TDMA communicating method of a base station that communicates with a plurality of zones that use different radio frequencies and a TDMA receiving apparatus thereof.

2. Description of the Related Art

Conventionally, a base station corresponding to TDMA (Time Division Multiple Access) communicating method using a fan-shaped beam antenna for sectoring a service area has a plurality of independent TDMA receiving apparatuses that use different transmission/reception radio frequencies for individual fan-shaped divided zone.

Such a sector zone method is mainly used to increase the number of subscriber stations accommodated in the service area of the base station with the TDMA receiving apparatuses having the communication capacity for a predetermined number of subscribers and radio frequency bands thereof.

Umeda et al., Japanese Patent Laid-Open Publication No. 3-143123, Ohya, Japanese Patent Laid-Open Publication No. 3-206743, and Nakayama et al., "26 GHz BAND DIGITAL SUBSCRIBER RADIO SYSTEM (26SS-Di) FOR HIGH-SPEED DIGITAL COMMUNICATIONS," IEEE ICC (International Conference on Communication), 1985. 23. 1. 1 (p. 729)—23. 1. 6 (P. 734) disclose examples of the conventional TDMA communicating method and the TDMA receiving apparatus. Japanese Patent Laid-Open Publication No. 3-143123 shows a random access method of a mobile communication system. In this system, when a random access is performed between a base station and each of mobile stations, the signal receive state of each mobile station is detected. Corresponding to the detected result, information that represents a transmission prohibit state or a transmission enable state is sent. Corresponding to the information, the signal transmission is controlled. Japanese Patent Laid-Open Publication No. 3-206743 shows a sector control system. In this system, the control channel zone of a radio base station has a non-directional control channel zone. The control channel zone is divided into a plurality of sectors. Speech channels are controlled for individual sectors. When an originating call or a terminating call is connected to/from a speech channel, a sector of a mobile station to be connected is determined by a radio loop check. Nakayama et al. shows a TDMA communicating method used in a 26 GHZ band digital subscriber radio system.

In the conventional sector zone type TDMA communicating method, independent frames are formed for respective divided zones with different radio frequencies. Considering only the receiving portion of the TDMA communicating apparatus, as shown in FIG. 1, receiving antennas for three fan-shaped divided zones are provided. Outdoor units and indoor units corresponding to the receiving antennas are independently provided. The structure of each of the three independent TDMA receiving apparatuses is the same. Only the receiving radio frequencies of the TDMA receiving apparatuses are different from each other. Thus, in the following description, the structure of only the first TDMA receiving apparatus will be described.

First, a receiving antenna 3a receives a radio frequency burst signal transmitted in the TDMA method by a subscriber station in a particular fan-shaped divided zone. The received signal is sent to an outdoor unit 2a disposed adjacent to the receiving antenna 3a. In the outdoor unit 2a, the received radio frequency signal is amplified and the received frequency is converted into a first intermediate frequency. The resultant signal is sent to a unit connecting cable 4a. The unit connecting cable 4a is connected to an indoor unit 1a so as to send the first intermediate frequency signal from the outdoor unit 2a to the indoor unit 1a. In the indoor unit 1a, a demodulated signal is restored from the first intermediate frequency signal. Moreover, in the indoor unit 1a, information signals of individual subscribers are obtained by synchronizing the TDMA frame.

The outdoor unit 2a has a low noise amplifier (LNA) 5a and a first frequency converter 6a. The low noise amplifier 5a amplifies a received radio frequency signal having weak power at a predetermined amplification factor with a small internal noise. The first frequency converter 6a converts the amplified signal into a first intermediate frequency signal so as to reduce a transmission loss of the signal sent from the unit connecting cable 4a to the indoor unit 1a.

The indoor unit 1a has a second frequency converter 7a, a demodulating circuit 8a, and a TDMA control circuit 9a. The second frequency converter 7a converts the first intermediate frequency signal into a second intermediate frequency signal so as to demodulate the first intermediate frequency signal supplied from the outdoor unit 2a. The demodulating circuit 8a inputs the second intermediate frequency signal and outputs a TDMA signal as a demodulated signal of the second intermediate frequency signal. The TDMA control circuit 9a inputs the TDMA signal, synchronizes the frames of the TDMA signal, and obtains information data signals of individual subscribers that have been time-division multiplexed.

Since the TDMA receiving apparatuses independently operate, the modulated signals that are input to the demodulating circuits 8a, 8b, and 8c are not always the same frequency modulation signal. Thus, the second intermediate frequencies converted by the second frequency converters 7a, 7b, and 7c are not always the same frequency.

As described above, the number of TDMA receiving apparatuses disposed in the base station should accord with the number of fan-shaped divided zones as outdoor units and indoor units.

Therefore, the following problem arises. In the TDMA receiving apparatuses of the base station corresponding to the conventional sector zone type TDMA communicating method, seperate demodulating circuits and TDMA control circuits are required for each individual divided zone. Thus, the hardware scale increases proportional to the number of divided zones, unlike the structure in which the service area is not sectored.

This is because TDMA signals with different radio frequencies sent from a plurality of divided zones corresponding to TDMA synchronous frames are different in individual divided zones.

SUMMARY OF THE INVENTION

An object of the present invention is to share the same functional circuit so as to simply the structure the entire apparatus and reduce the size and power consumption thereof.

The present invention is a time division multiple access (TDMA) communicating method for performing time division multiple access for one-point-to-many-point communication between a base station and a plurality of subscriber stations with radio frequencies corresponding to zones. A subscriber station is adapted for transmitting TDMA signals with time slots of a common TDMA synchronous frame in such a manner that the TDMA signals of the subscriber stations do not overlap. The base station converts the TDMA signals of the subscriber stations into signals with the same center frequency, combines the powers of the converted signals, and demodulates the resultant signals.

The number of time slots of the TDMA synchronous frame of the TDMA signals of the subscriber stations is varied corresponding to the density of subscribers in the zones or corresponding to transmission requests of the subscriber stations.

In the base station, since the TDMA signals are converted into intermediate frequency signals with the same center frequency and then combined corresponding to the above-described TDMA communicating method, signals of individual subscriber stations can be demodulated by the common demodulating unit.

The TDMA receiving apparatus for use with the base station according to the present invention comprises a plurality of frequency converters and a combining unit. The frequency converters are adapted for converting TDMA signals with different radio frequencies into intermediate frequency signals with the same frequency so as to enable input of the TDMA signals to a common demodulating circuit. The combining unit combines the powers of the intermediate frequency signals converted by the frequency converters.

The TDMA receiving apparatus of the present invention has a plurality of antennas, outdoor units disposed adjacent thereto, and an indoor unit connected thereto. The outdoor units each have a low noise amplifier and a first frequency converter for reducing the power loss of signals supplied to the indoor unit.

The indoor unit has a plurality of second frequency converters and a power combining unit. The second frequency converters convert the signals supplied from the outdoor units to intermediate frequency signals with the same intermediate frequency. The power combining unit combines the powers of the converted signals.

The indoor unit has a control circuit for obtaining data of each subscriber station from the demodulated data signal having the structure of TDMA frames.

The indoor unit has a frequency control circuit that supplies a control signal for controlling the frequencies of the second frequency converters so as to externally vary radio frequencies that can be received and demodulated.

The frequency converters of the TDMA receiving apparatus according to the present invention convert TDMA signals with different radio frequencies sent with the same TDMA synchronous frame into intermediate frequency signals with the same frequency. The combining unit combines the powers of the intermediate frequency signals converted from the TDMA signals assigned to different time slots for signals of subscriber stations.

As a result of of the present invention, regardless of the number of divided zones, the demodulating circuit and the TDMA control circuit can be shared. Thus, the size of the receiving apparatus can be reduced and thereby the power consumption can be decreased.

This is because the TDMA control is performed for individual divided zones with different radio frequencies corresponding to a common TDMA synchronous frame. In addition, time slots are assigned to the divided zones so that the time slots do not overlap. Thus, when the powers of the same intermediate frequency are combined, data of different divided regions can be prevented from colliding. Consequently, signals of the divided zones can be demodulated as one TDMA synchronous frame.

As a second result of the present invention, the total transmission capacity receivable by the base station can be assigned to each divided zone corresponding to the communication traffic amount thereof. Thus, the difference of the density of subscribers and transmission requests for each divided zone can be properly handled. Consequently, the performance of the base station can be fully realized.

This is because the number of time slots of a common TDMA synchronous frame assigned to individual divided zones can be varied within the transmission capacity of the base station.

These and other objects, features and advantages of the present invention will become more apparent in light of the following detailed description of best mode embodiments thereof, as illustrated in the accompanying drawings.

BRIEF DESCRIPTION OF THE DRAWINGS

FIGS. 3(A) and 3(B) are schematic diagrams for comparing TDMA synchronous frame structures and frequency spectrums of the TDMA communicating method according to the present invention and a conventional TDMA communicating method; and FIG. 4 is a block diagram showing the entire transmitting and receiving portions including the receiving apparatus shown in FIG. 2 and a transmitting apparatus.

DESCRIPTION OF THE PREFERRED EMBODIMENTS

Figure 1:
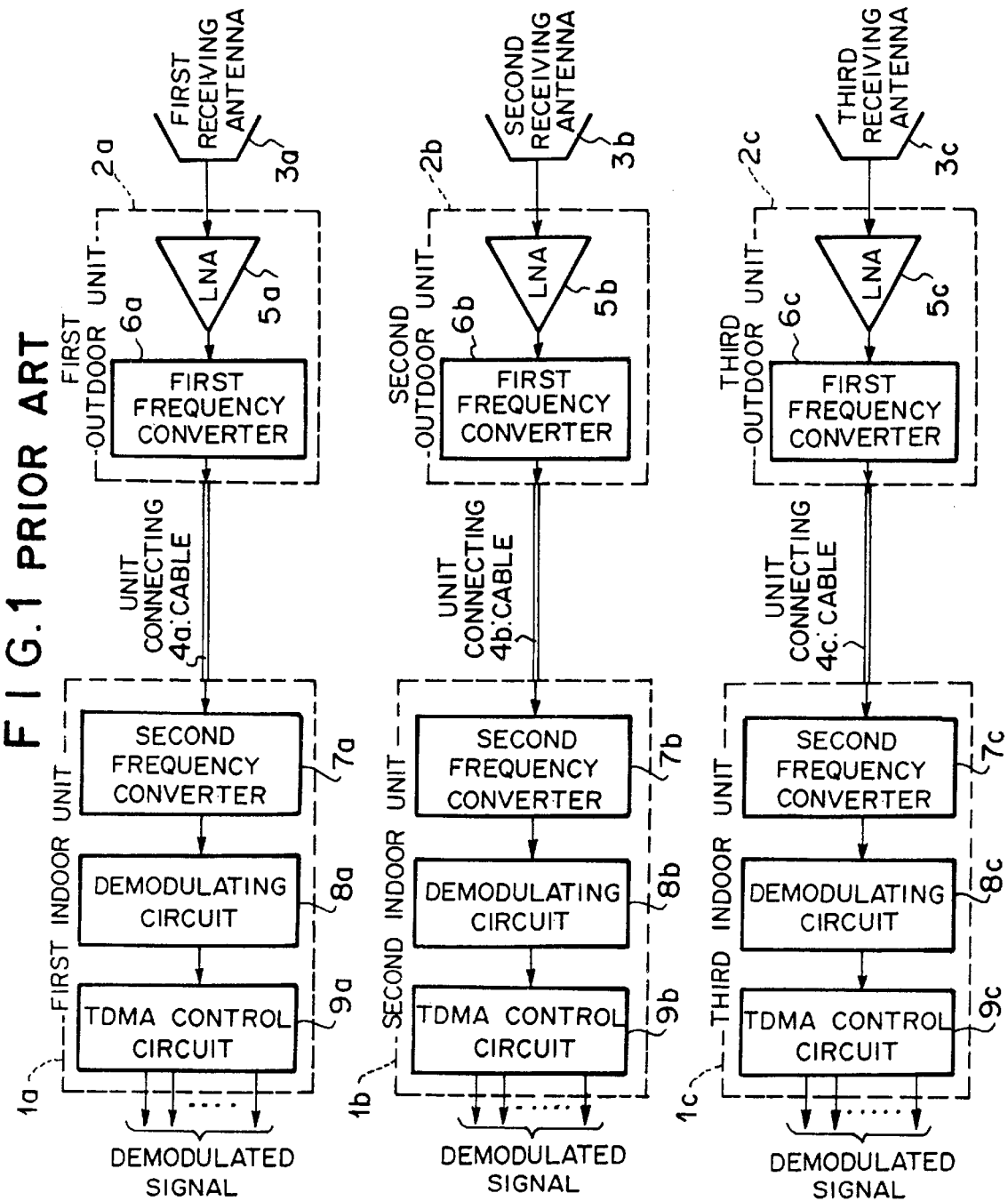
FIG. 1 is a block diagram showing the structure of a conventional TDMA receiving apparatus.
Figure 2:
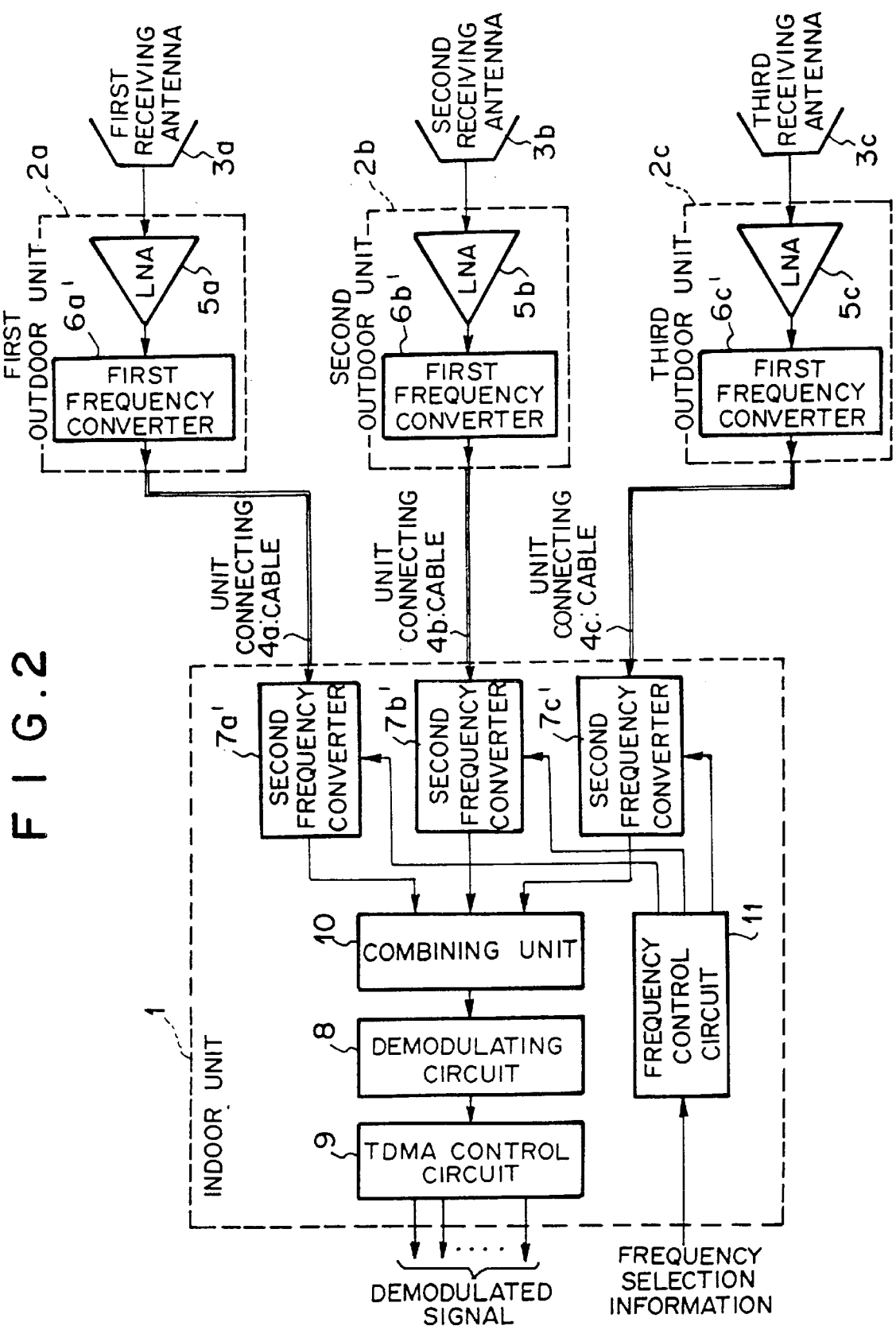
FIG. 2 is a block diagram showing the structure of a TDMA receiving apparatus according to an embodiment of the present invention.

The present invention will be described with reference to the accompanying drawings. FIG. 2 is a block diagram showing the structure of a first embodiment of the present invention. Referring to FIG. 2, a first first-intermediate frequency signal, a second first-intermediate frequency signal, and a third first-intermediate frequency signal are sent from a first outdoor unit 2a, a second outdoor unit 2b, and a third outdoor unit 2c to an indoor unit 1 through unit connecting cables 4a to 4c, respectively. With the input three first-intermediate signals, one demodulated signal is obtained. The demodulated signal is synchronized with TDMA frames. Thus, information signals for individual subscribers of all the fan-shaped divided zones are obtained and output to the outside of the indoor unit 1.

Next, the structure of the indoor unit 1 will be described in detail.

The indoor unit 1 has a demodulating circuit 8, a TDMA control circuit 9, first to third second-frequency converters 7a' to 7c', a combining unit 10, and a frequency control circuit. The demodulating circuit 8 receives a second intermediate frequency signal and demodulates the input signal into a TDMA signal. The TDMA control circuit 9 synchronizes the demodulated signal corresponding to a TDMA synchronous frame that is common in three fan-shaped divided zones and obtains information signals of subscriber stations of the three fan-shaped divided zones. The first to third second-frequency converters 7a' to 7c' convert the three first-intermediate frequency signals into second-intermediate frequency signals with the same frequency so as to demodulate the first-intermediate frequency signals. The combining unit 10 combines the powers of the second-intermediate frequency signals converted by the second-frequency converters 7a' to 7c'. The combining unit 10 is, for example, a power combining unit composed of a hybrid transformer combiner, resistors combiner, or the like.

In addition, the indoor unit 1 has a frequency control circuit 11 that generates a frequency conversion control signal for controlling the first to third second-frequency converters 7a' to 7c' in response to frequency selection information supplied from the outside of the indoor unit 1.

Next, with reference to FIGS. 3(A) and 3(B), the TDMA communicating method and the operation of the TDMA receiving apparatus for use with the base station according to the present invention will be described.

FIGS. 3(A) and 3(B) are schematic diagrams which compare TDMA synchronous frame structures (FIG. 3(A) and frequency spectrums of the TDMA communication method (FIG. 3(B) according to the present invention and the conventional TDMA communicating method. In FIGS. 3(A) and 3(B), conventionally, each of three fan-shaped divided zone has an independent TDMA synchronous frame. Each of the TDMA synchronous frames has a data region that has 20 time slots (TS) assigned to subscriber stations in each fan-shaped divided zone.

The frequency spectrum of a radio frequency of each conventional fan-shaped divided zone has a relatively narrow frequency band whose center frequency that is different in each fan-shaped divided zone.

On the other hand, according to the present invention, 20 TS of each fan-shaped divided zone are assigned to each fan-shaped divided zone in such a manner that time slots of individual fan-shaped divided zones do not overlap. Thus, the resultant TDMA synchronous frame has 60 TS corresponding to the subscriber station in all the fan-shaped divided zones and is common in all the fan-shaped divided zones. The frequency spectrums of radio frequencies of the fan-shaped divided zones of the present invention have center frequencies as with the conventional TDMA synchronous frames. However, since the data capacity of the TDMA synchronous frame according to the present invention is three times larger than that of the conventional TDMA synchronous frame, the frequency band is tripled. When the common TDMA synchronous frame is used, time slots of other zones are treated as blank slots. Thus, a receiving apparatus that has a larger transmission capacity than that is actually used and a wider frequency band than that of the conventional frame are required.

Consequently, provided that a receiving apparatus with a satisfactorily wide frequency band and a satisfactorily large transmission capacity is used, a common TDMA synchronous frame for transmitting signals of individual fan-shaped divided zones can be used. When the radio frequency signals of individual fan-shaped divided zones are converted into common second-frequency signals and their powers are combined, since time slots do not overlap, a combined TDMA signal that includes signals of subscribers of all the fan-shaped divided zone can be obtained.

As an example in which the frequency band and transmission capacity can be increased without a problem, a picture providing system is known. When a picture providing service such as CATV is performed with radio signals, the transmission capacity of picture data sent from the base station to the subscriber stations in the down link direction is much larger than the transmission capacity of control data such as request data sent from the subscriber stations to the base station in the up link direction. Thus, asymmetrical communications are required. Consequently, since the transmission capacity and the frequency band of data sent in the up link direction are small, the increases of the transmission capacity and the frequency band of the communicating method of sharing a TDMA synchronous frame may not become a problem in many situations.

In the above-described embodiment, the predetermined number of time slots of the TDMA synchronous frame are equally assigned to each fan-shaped divided zone. However, when the number of time slots assigned to each fan-shaped divided zone is varied corresponding to the density of subscribers in the pre-assignment method or corresponding to the number of transmission requests in the demand-assignment method, the transmission capacity can be assigned corresponding to the communication traffic. Thus, at this point, the communication facility can be more effectively used than the above-described embodiment.

Next, the structure of the entire transmitting and receiving portions of the base station including the receiving apparatus shown in FIG. 2 and a transmitting apparatus will be described with reference to FIG. 4. In FIG. 4, for simplicity, similar portions to those in FIG. 2 are denoted by similar reference numerals and their description is omitted. In FIG. 4, reference numeral 9 is a TDMA control circuit. As with the TDMA control circuit shown in FIG. 2, the TDMA control circuit 9 shown in FIG. 4 obtains information signals of subscriber stations of three fan-shaped divided zones from a demodulated signal sent from a demodulating circuit 8. In addition, the TDMA control circuit 9 shown in FIG. 4 receives a plurality of modulated signals to be transmitted to the subscriber stations, arranges these signals into one signal sequence as a predetermined synchronous frame in the TDMA method, and outputs the resultant signal sequence to a modulating circuit 12. The modulating circuit 12 modulates the signal sequence with a first frequency. Reference numeral 13 is a separating unit that separates the modulated signal into signals for each antenna. Reference numerals 4d, 4e, and 4f are unit connecting cables for sending separated modulated signals from the indoor unit 1 to the first to third outdoor units 2a, 2b, and 2c, respectively. Reference numerals 14a to 14c are frequency converters that convert the first-frequency modulated signals into transmission frequency signals. Reference numerals 15a to 15c are power amplifiers that amplify the powers of the transmission frequency signals. Reference numerals 3d, 3e, and 3f are first to third transmission antennas that radiate the transmission frequency signals to three directional space or fan-shaped directional space. In FIG. 4, the transmitting antennas 3d, 3e, and 3f are paired with receiving antennas 3a, 3b, and 3c, respectively. However, when an omnidirectional antenna is used, one transmitting/receiving antenna may be used.

It should be noted according to the present invention, the transmitting portion is not limited to the above-described structure.

Next, with reference to FIG. 5, the second embodiment of the present invention will be described.

Figure 5:
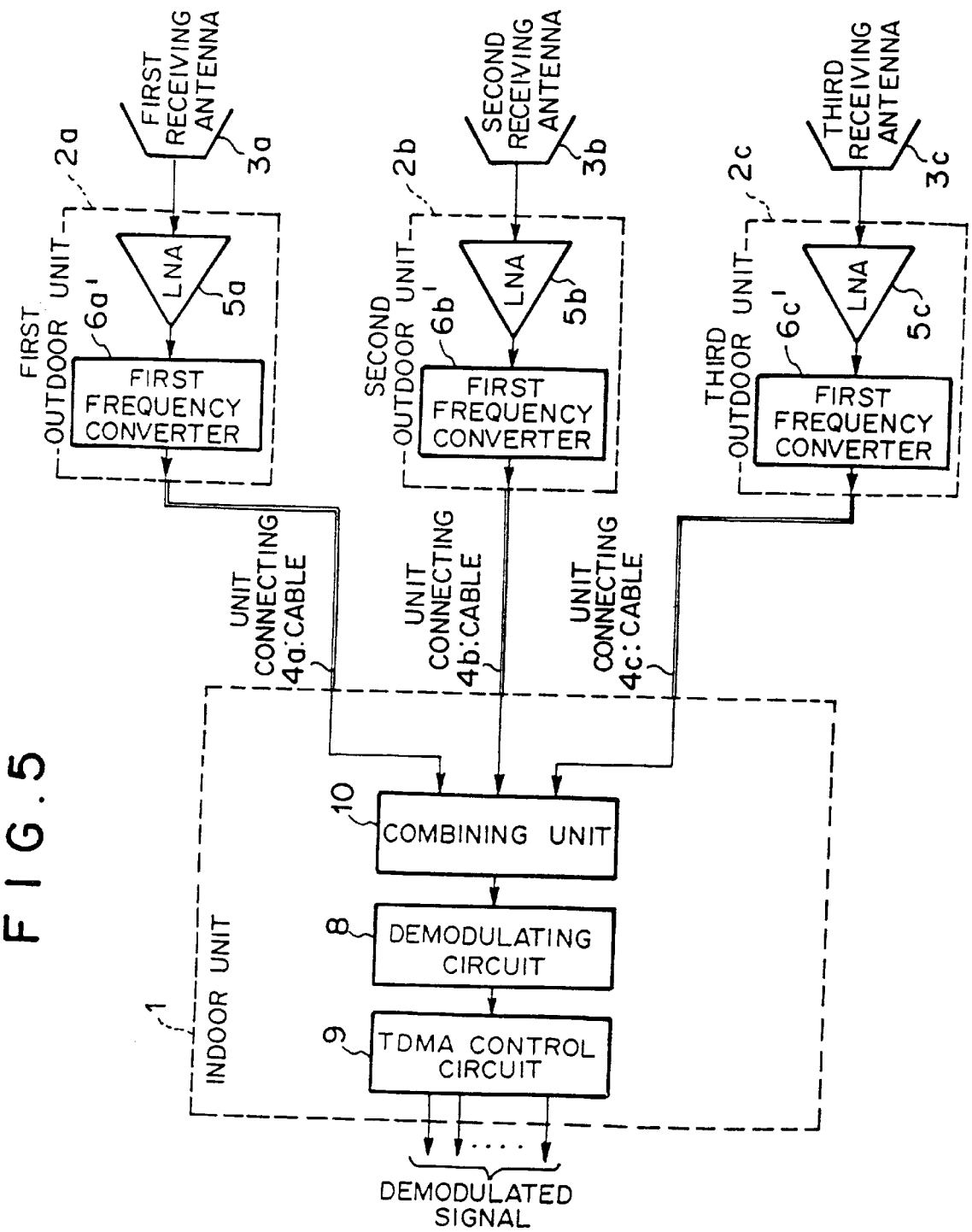
FIG. 5 is a block diagram showing a TDMA receiving apparatus according to a second embodiment of the present invention.

FIG. 5 is a block diagram showing the structure of a second embodiment of the present invention. The difference between the second embodiment and the first embodiment is that the powers of three first-intermediate frequency signals sent to an indoor unit 1 are combined directly by a combining unit 10.

First frequency converters 6a', 6b', and 6c' in outdoor units 2a, 2b, and 2c convert reception frequency signals into intermediate frequency signals as input signals to a demodulating circuit 8. Thus, in the indoor unit 1, the powers of the first intermediate frequency signals with the same frequency can be combined.

In this case, the first frequency converters 6a', 6b', and 6c' in the outdoor units 2a, 2b, and 2c should vary the deviation amounts of frequencies corresponding to radio frequencies used in the individual fan-shaped divided zones and should output coincident frequency signals to a combining unit 10. Thus, unlike with the structure of the first embodiment of which radio frequencies can be varied only by the indoor unit 1, the operation of the indoor unit 1 shown in FIG. 5 is restricted. Consequently, the structure shown in FIG. 5 is limited to the case that the radio frequencies for use are fixed and they are not varied during the operation. However, when the structure shown in FIG. 5 is used, the hardware scale can be remarkably reduced.

In the above-described embodiments, a single carrier method of which one modulated wave is used for each fan-shaped divided zone was explained. However, for a multi-carrier method of which the TDMA transmission is performed with a plurality of modulated waves for each fan-shaped divided zone, by combining intermediate frequencies with different center frequencies, the demodulating circuit and the TDMA control circuit can be shared for each fan-shaped divided zone.

Although the present invention has been shown and described with respect to best mode embodiments thereof, it should be understood by those skilled in the art that the foregoing and various other changes, omissions, and additions in the form and detail thereof may be made therein without departing from the spirit and scope of the present invention.

What is claimed is:

1. A time division multiple access (TDMA) communicating method comprising the steps of:

performing a time division multiple access for a one-point-to-multi-point communication between a base station and a plurality of subscriber stations as outdoor units with radio frequencies corresponding to zones;

transmitting, from the subscriber stations, TDMA signals with time slots of a common TDMA synchronous frame by each of the subscriber stations in the outdoor units in such a manner that the TDMA signals of the subscriber stations do not overlap;

receiving a plurality of TDMA signals with different radio frequencies transmitted by each of the subscriber stations in the outdoor units said receiving step being performed by a plurality of reception units;

converting, in the base station, the TDMA signals of the subscriber stations into signals with a same frequency, said converting step being performed by a plurality of converters;

combining the converted signals so as not to overlap the TDMA signals, said combining step being performed by a combining unit in the base station;

demodulating the combined signal, said demodulating step performed by a demodulating circuit in the base station; and obtaining information signals of the subscriber stations from the demodulating signal by a TDMA control circuit on the base station.

2. The TDMA communicating method as set forth in claim 1, wherein the number of time slots of the TDMA synchronous frame of the TDMA signals of the subscriber stations is varied corresponding to the density of subscribers of the zones and corresponding to transmission requests of the subscriber stations.

3. A TDMA receiving apparatus for use with a base station for transmitting a time division multiplex information signal in a one-point-to-multi-point communication performed between the base station and a plurality of subscriber stations in a TDMA method, the apparatus comprising:

a plurality of reception units for receiving a plurality of TDMA signals with different radio frequencies in an outdoor unit;

a plurality of converters for converting the received signals into intermediate frequency signals with a same frequency in an indoor unit;

a combining unit for combining the intermediate frequency signals so as not to overlap the TDMA signals in the indoor unit;

a demodulating circuit for demodulating the combined signal generated by said combining unit in the indoor unit; and a TDMA control circuit in the indoor unit for obtaining information signals of the subscriber stations from the demodulated signal.

4. The TDMA receiving apparatus as set forth in claim 3, further comprising a plurality of receiving antennas for receiving the TDMA signals with different radio frequencies from different directions.

5. A TDMA receiving apparatus for use with a base station for transmitting a time division multiplex information signal in a one-point-to-multi-point communication performed between the base station and a plurality of subscriber stations in a TDMA method, the apparatus comprising:

a plurality of receiving antennas for receiving the TDMA signals with different radio frequencies from different directions;

a plurality of outdoor units disposed adjacent to the receiving antennas;

a plurality of reception units in the outdoor units for receiving the TDMA signals with different radio frequencies from said plurality of receiving antennas;

a plurality of first converters in the outdoor units adapted for converting signals received from the reception units into intermediate frequency signals and outputting the intermediate frequency signals;

a plurality of unit connecting cables for sending the intermediate frequency signals received from the outdoor units;

an indoor unit coupled to the plurality of unit connecting cables;

a plurality of converters in the indoor unit for converting intermediate frequency signals into intermediate frequency signals with a same frequency;

a combining unit for combining the intermediate frequency signals so as not to overlap the TDMA signals in the indoor unit, the combining unit generating a combined signal;

a demodulating circuit for generating a demodulated signal from the combined signal generated by said combining unit; and a TDMA control circuit in the indoor unit for obtaining information signals of the subscriber stations from the demodulated signal.

6. The TDMA receiving apparatus as set forth in claim 5, wherein the indoor unit comprises:

a plurality of second frequency converters for converting the first intermediate frequency signals received from the outdoor units to second intermediate frequency signals with the same second intermediate frequency;

a combining unit combining the second intermediate frequency signals;

a demodulating circuit receiving the combined signal of the second intermediate frequency signals and demodulating the combined signal; and a TDMA control circuit generating data of each of the subscriber stations from a demodulated data signal composed of one TDMA frame supplied from the demodulating circuit.

7. The TDMA receiving apparatus as set forth in claim 5, wherein the outdoor units each comprises:

a low noise amplifier (LNA) for amplifying a weak power of the received radio frequency signal with low internal noise; and a first frequency converter for converting the amplified radio frequency signal into a first intermediate frequency signal with a lower frequency than the radio frequency of the received radio frequency signal so as to send the first intermediate signal to the indoor unit through the unit connecting cable with a small power loss.

8. The TDMA receiving apparatus as set forth in claim 7, wherein the indoor unit comprises:

a plurality of second frequency converters for converting the first intermediate frequency signals received from the outdoor units to second intermediate frequency signals with the same second intermediate frequency;

a combining unit combining the second intermediate frequency signals;

a demodulating circuit receiving the combined signal of the second intermediate frequency signals and demodulating the combined signal; and a TDMA control circuit generating data of each of the subscriber stations from a demodulated data signal composed of one TDMA frame supplied from the demodulating circuit.

9. The TDMA receiving apparatus as set forth in claim 8, wherein the indoor unit further comprises a frequency control circuit for sending a control signal for controlling the converting frequencies of the second frequency converters so as to vary radio frequencies that can be received and demodulated corresponding to external frequency selection information.

10. The TDMA receiving apparatus as set forth in claim 7, wherein the indoor unit comprises:

a combining unit combining the first intermediate frequency signals supplied from the outdoor units;

a demodulating circuit receiving the combined signal of the first intermediate frequency signals and demodulating the combined signal; and a TDMA control circuit generating data of each subscriber station from the demodulated data signal composed of a TDMA frame supplied from the demodulating circuit.

11. A TDMA communication apparatus for use with a base station for transmitting a time division multiplex information signal in one-point-to-multi-point communication performed between the base station and a plurality of subscriber station in a TDMA method, the apparatus comprising:

means for inputting a plurality of modulated signals to be transmitted to a subscriber station, and for arranging these signals to one signal sequence as a predetermined synchronous frame in the TDMA method;

means for modulating the one signal sequence with a first frequency, and for converting the first frequency modulated signals into transmission frequency signals;

means for receiving a plurality of TDMA signals with different radio frequencies from the subscriber stations;

a converter for converting the received signals into intermediate frequency signals with the same center frequency;

means for combining the powers of the intermediate frequency signals into a combined signal;

a demodulator for demodulating the combined signal; and means for obtaining information signals of the subscriber stations from the demodulated signal.

* * * * *